United States Patent [19]

Cutore

[11] 4,269,240
[45] May 26, 1981

[54] UNIT ADAPTED TO BE COMPLETELY HIDDEN IN THE GROUND AND INTENDED TO BE USED IN AIRCRAFT REFUELLING OPERATIONS

[76] Inventor: Gaetano Cutore, Via Asmara 33, Rome, Italy

[21] Appl. No.: 12,123

[22] Filed: Feb. 14, 1979

[30] Foreign Application Priority Data

Feb. 23, 1978 [IT] Italy .............................. 48162 A/78

[51] Int. Cl.³ .......................... B65B 3/04; B64F 1/28
[52] U.S. Cl. ................................. 141/392; 137/234.6; 137/363; 222/527; 244/114 R; 244/135 R
[58] Field of Search .................... 137/234.6, 236, 362, 137/363; 141/231, 279, 284, 387, 388, 392; 222/527, 538; 244/114 R, 135 R

[56] References Cited

U.S. PATENT DOCUMENTS

| | | | |
|---|---|---|---|
| 1,867,602 | 7/1932 | Stukenborg | 222/527 |
| 2,084,548 | 6/1937 | Bennett | 137/234.6 |
| 2,434,824 | 1/1948 | Watts, Jr. et al. | 137/234.6 |
| 2,642,957 | 6/1953 | Watts, Jr. et al. | 244/114 R |

*Primary Examiner*—Frederick R. Schmidt
*Attorney, Agent, or Firm*—Brooks, Haidt, Haffner & Delahunty

[57] ABSTRACT

A refuelling unit for aircraft is moveable from a lower position completely hidden in a below-ground cavity to an operating position above ground. The unit has a sliding cover and means are provided for holding a vertically movable platform in intermediate position between the fully raised and lowered positions.

3 Claims, 11 Drawing Figures

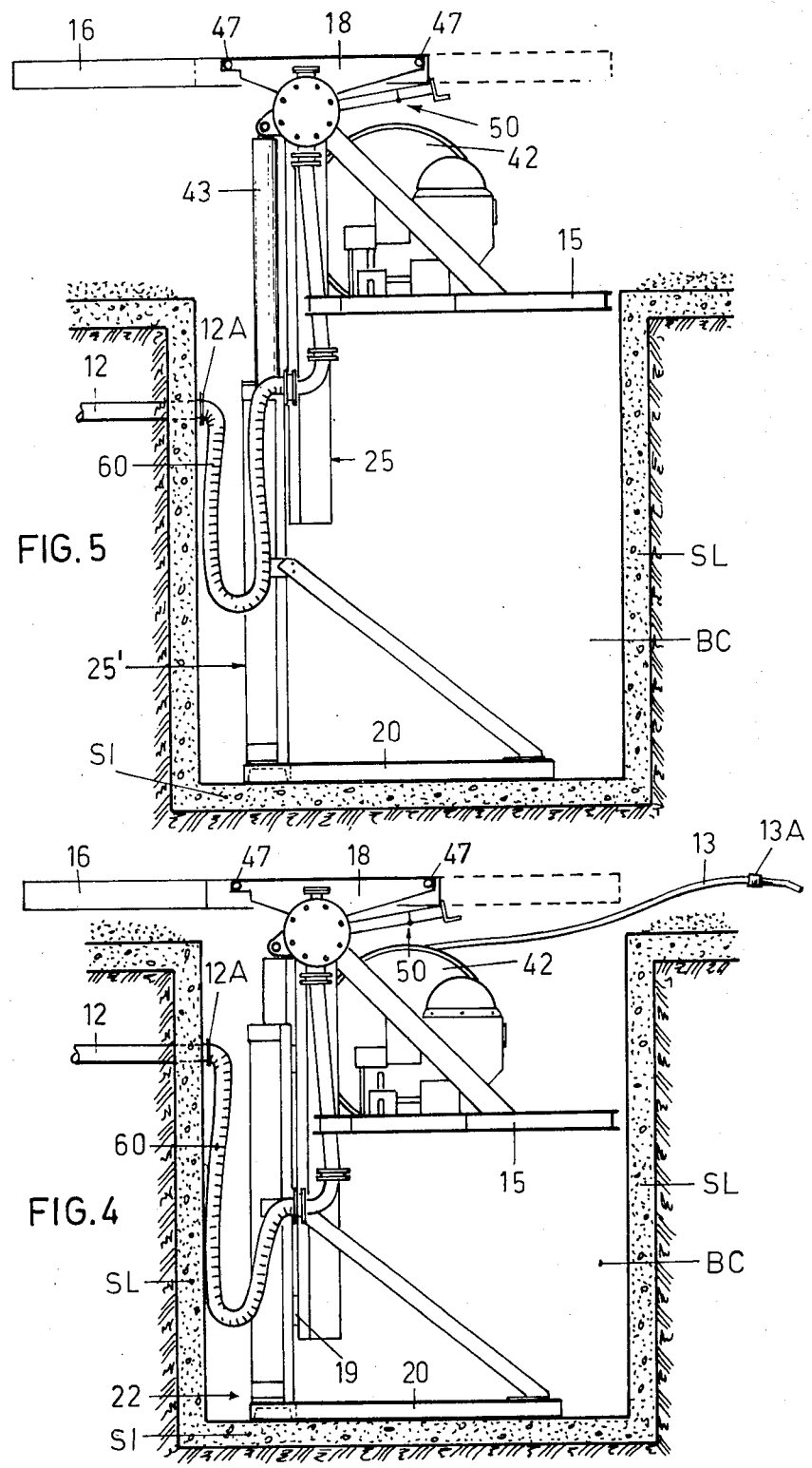

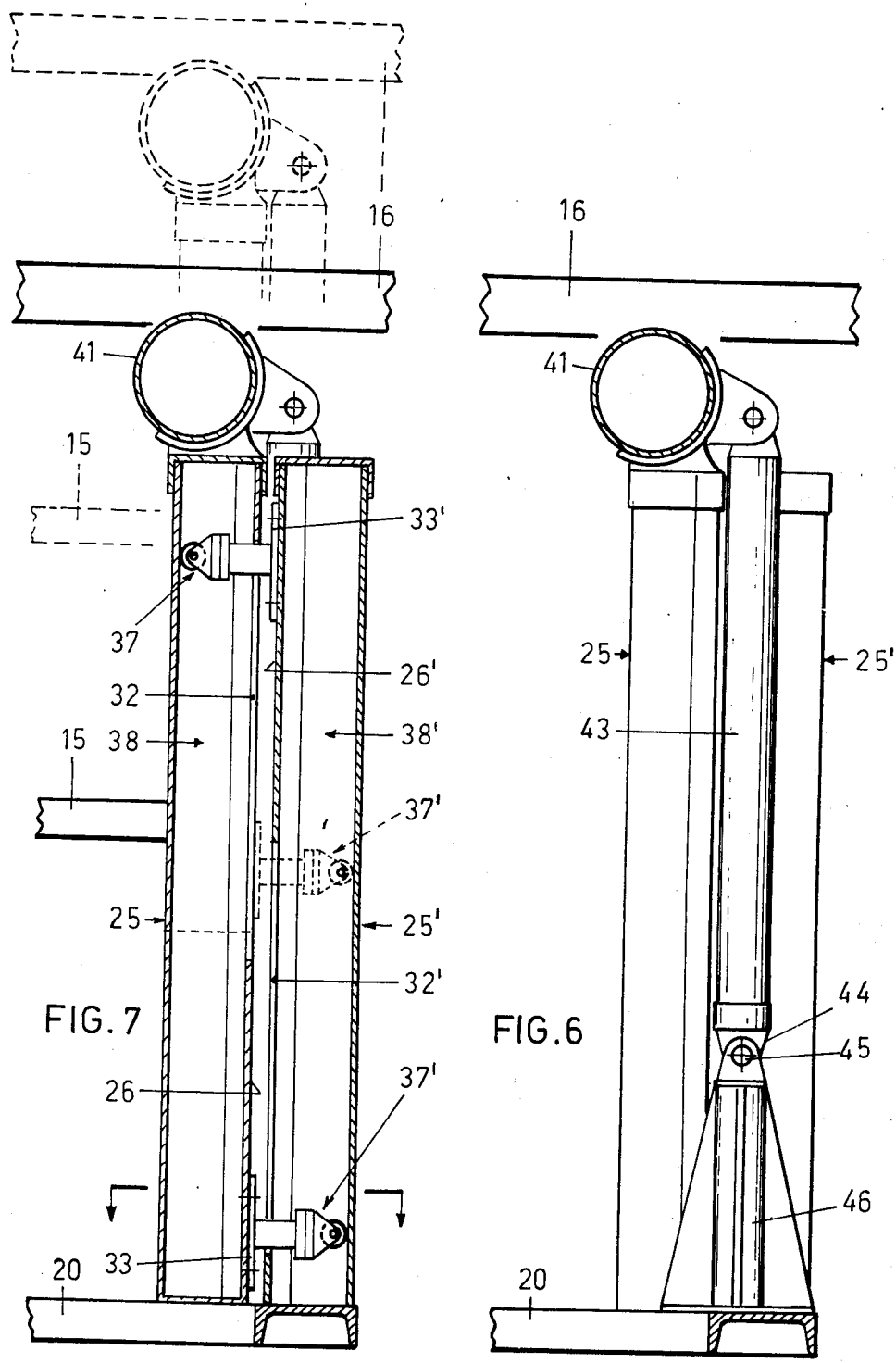

UNIT ADAPTED TO BE COMPLETELY HIDDEN IN THE GROUND AND INTENDED TO BE USED IN AIRCRAFT REFUELLING OPERATIONS

This invention refers to an improved unit adapted to be completely hidden in the ground, comprising all the necessary equipment for delivering fuel to aircraft.

The widespread use of aircrafts has brought about the necessity in airports of refuelling simultaneously a plurality of aircraft. Heretofore two different systems were used to perform these refuelling operations.

A first system involves the use of tank-trucks carrying both the fuel to be delivered and all that is necessary for controlling and metering this delivery, such as the delivery pump, hose for connecting the tank truck to the aircraft, filters, manometers, indicators of the rate of flow, meters of the fluid delivered, and the like. These tank-trucks have many inherent drawbacks, such as extremely high costs of purchase, inspection and maintenance and the necessity to be refuelled in turn with the fuel to be delivered to aircraft, which results in dead times for the idle trips with an empty tank from the aircraft parking areas to the main refuelling tank for tank-trucks and back to the parking areas with the tank filled up.

Moreover, tank-trucks are subjected to precise restrictions of bulk and weight and, accordingly, of load, while at present there is a tendency to construct larger and larger aircraft with a resulting increase in the amounts of fuel required for the refuelling operations and this results in the insufficiency of these vehicles.

The other system, which is widespread at present, consists in providing the airports with a fuel distribution pipe-line from a large central supply tank to a plurality of delivery terminals, each terminal being placed close to each aircraft parking area and comprising a delivery opening contained within a closed trap.

However, also this system requires the use of vehicles carrying a hose adapted to connect the delivery opening to the aircraft tank, filters, apparatus, instruments and accessories for controlling and metering the delivery operation.

Accordingly, as will be easily understood, also this second system does not overcome the drawbacks resulting from the necessity of a plurality of vehicles to be driven close to the aircraft parking areas to perform the refuelling operation.

This invention provides for a unit which eliminates the necessity of using any vehicles at all for the refuelling operation of aircraft.

According to the invention, each terminal of the fuel distribution pipe-line placed close to an aircraft parking area comprises a self-sufficient unit including all the apparatus, devices, instruments and accessories required to refuel an aircraft.

Furthermore, these units, that from now on will be called refuelling stations, are completely out of sight when they are not operating.

According to the invention, each refuelling station comprises an outer body containing all the above-mentioned apparatus, devices, instruments and accessories, which outer body is vertically movable from a raised operative position, where the refuelling operation is performed, to an inoperative position where this body is completely received within a suitable cavity so as to be protected and out of sight. Generally, such cavity is a pit dug in the ground.

The refuelling station according to the invention is characterized in that, in an emergency case, the fuel can also be delivered by slightly raising the unit, since a partial sliding movement of the sliding "roof" or cover is sufficient to expose the unit and thus get out the delivery hose.

The invention will be now described in detail with reference to the annexed drawings, wherein:

FIG. 4 is a similar side elevation view showing the unit in a partially raised position;

FIG. 5 is a similar side elevation view showing the unit in its completely raised position;

FIG. 6 is an enlarged fragmentary elevation view showing a detail of the raising and guiding members of the unit according to the invention;

FIG. 7 is a vertical section view of the detail shown in FIG. 6, showing the details of the guiding members;

FIG. 8 is a fragmentary top view showing, in smaller scale, the position of the raising and guiding members in respect to the unit;

FIG. 9 is an enlarged, partially sectioned perspective view showing in detail the guiding members of the unit;

FIG. 10 is an enlarged side elevation view showing the detail of a safety device in its operative position; and FIG. 11 is a similar view of the safety device in its inoperative position.

Figure 1:
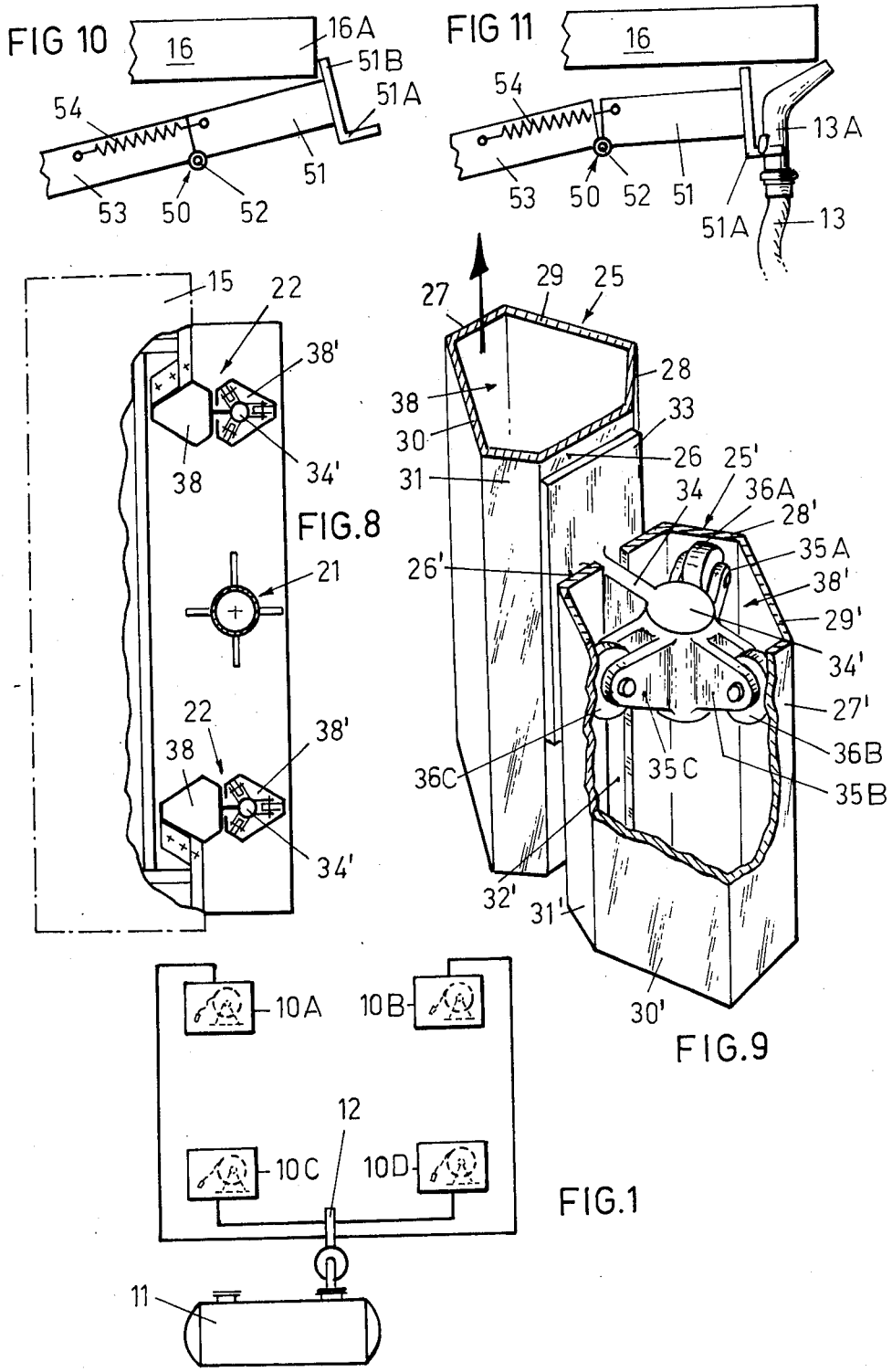
FIG. 1 is a schematic view of an arrangement of refuelling stations or units according to the invention, in an airport.

It can be seen that the basic elements of these stations which are adapted to be completely hidden in the ground and are intended to refuel aircraft, as shown in FIG. 1, are a tank (or a plurality of tanks) 11 adapted to contain the fuel to be delivered to the aircraft, an underground supply pipe-line 12 and a plurality of refuelling units or stations 10A, 10B, 10C, 10D which are adapted to be completely hidden in the ground and are arranged on a landing area, each of them serving one aircraft parking area.

The invention is essentially characterized in that refuelling units 10A, 10B, 10C, 10D can move from an inoperative position, wherein they are completely hidden in the ground and then out of sight, to an exposed operative position, by vertically lifting the unit as a whole and causing the roof or cover thereof to slide horizontally.

Figure 2:
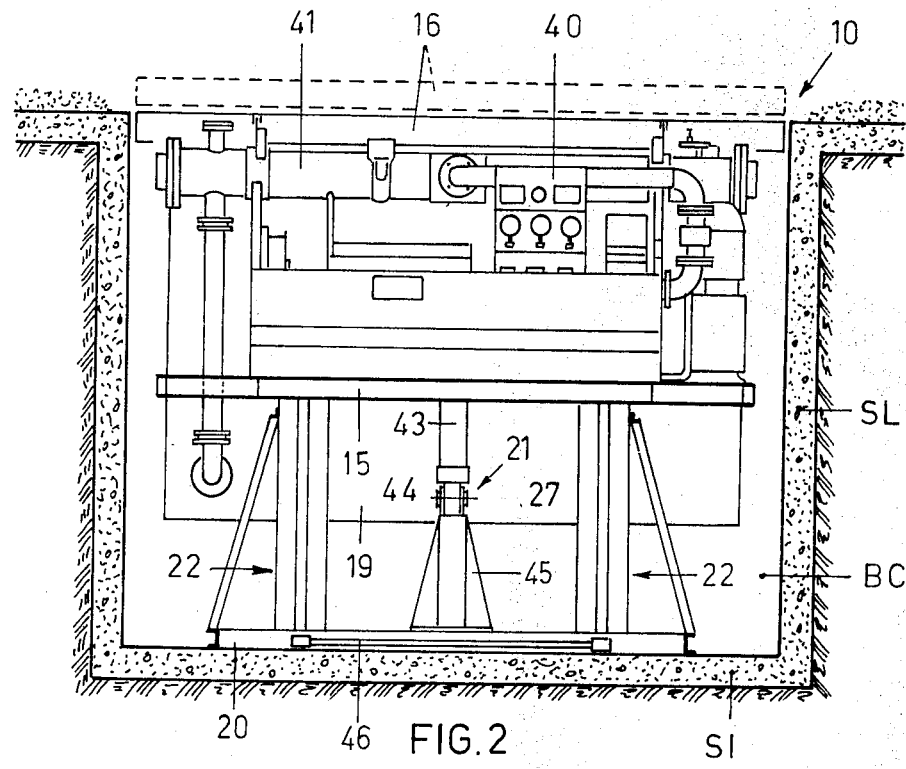
FIG. 2 is a front elevation view partially sectioned, showing the unit according to the invention in its concealed or hidden inoperative position.
Figure 3:
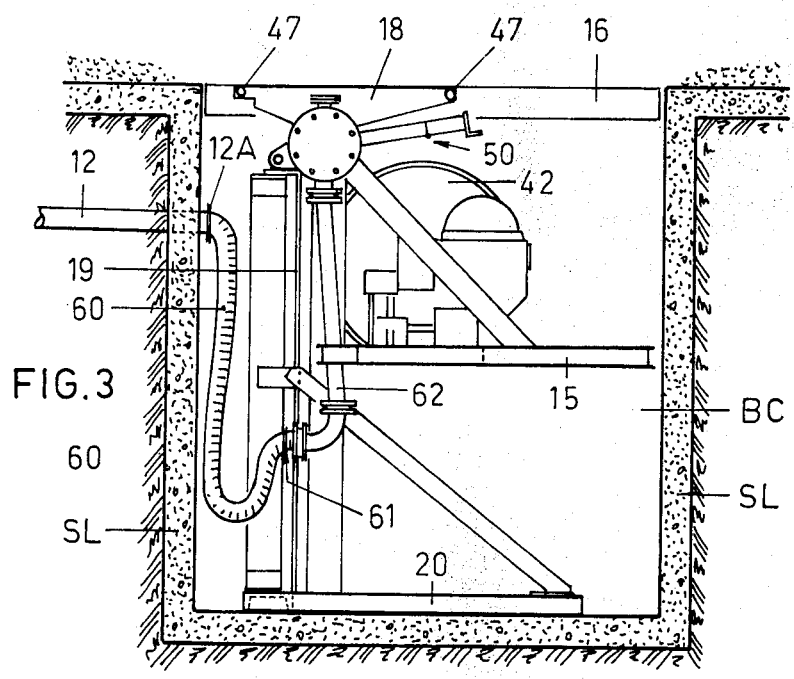
FIG. 3 is a side elevation view of the unit shown in FIG. 1.

As clearly shown in FIGS. 2 and 3, the refuelling station, generally indicated by reference 10, is received within a pit BC, having the shape of an upwardly opened rectangular parallelepipedon, dug in the ground of an airport and suitably covered, preferably with a thin side and bottom covering of concrete, as indicated by references SL and Sl.

This refuelling station comprises a solid platform 15 having a stout upper cover or roof 16, slidingly mounted on frame 18 carried by platform 15; a rear wall 19; a base 20 anchored to lower slab Sl; a central hydraulic cylinder and piston unit 21 for supporting and lifting platform 15; and, two side guiding members 22 substantially aligned with lifting unit 21 and laterally offset in respect to the centre of platform 15, these members 22 guiding the vertical movements of platform 15.

Of course, delivery hose 13 and the relative winding drum 42, as well as the accessories required for the fuel delivery operation, will also be mounted on platform 15.

The two guiding members have a particular construction and they are especially designed to assure a reliable and safe operation wherever the unit according to the invention is installed, both at high latitudes in frozen grounds, at extremely low temperatures, and at low latitudes in dry and sandy grounds, at high temperatures.

Each guiding member 22 comprises a pair of elongated hollow members (FIGS. 6-9) of which member 25 is anchored to lower slab Sl of pit BC and member 25' is rigidly connected to platform 15.

Members 25 and 25' are identical with each other and they are made from a solid metal sheet cut, bent and welded in the form of a right prism having an irregular hexagonal cross section. Each members 25 and 25' comprises a main wall 26 and a wall 27 parallel and opposite thereto. Wall 26 and 27 are connected by two pairs of opposite side walls, 28 and 29, 30 and 31, respectively, and the same numerals are used to indicate the parts of the structure of both members 25 and 25', the numerals referring to member 25' being provided witn an prime symbol.

Moreover, main wall 26 is provided with a central longitudinal slot 32 extending throughout the length thereof with the exception of a short end length where a plate 33 is welded to main wall 26.

A solid web 34 is integral with plate 33 and carries at the free end thereof a length of a cylindrical support 35 comprising three forks 35A, 35B, 35C protruding therefrom. These forks are uniformly spaced of 120° from each other and each of them carries a ball bearing mounted idle therein. The ball bearings are indicated by references 36A, 36B and 36C respectively, and the unit comprising these bearings and the support thereof is generically indicated by reference 38 (or 38').

As clearly seen in FIGS. 7 and 9, hollow members 25 and 25', having identical structures and forming together each guiding member, are placed side by side and one is upside-down in respect to the other so that main wall 26 and 26' are parallel and adjacent to each other, grooves 32 and 32' correspond to each other and web 34 (or 34') of a guiding member 25 (or 25') is received within groove 32 (or 32') of the other guiding member, so that unit 38 of member 25 is received within cavity 39' of member 25' and viceversa.

It can be noted that forks 35A, 35B and 35C are in such an arrangement and of such a length that, when members 25 and 25' are assembled and each unit 38 or 38' is received within cavity 39 or 39', bearings 36A, 36B and 36C of one member are respectively engaged with walls 28', 27' and 30' of the other member and viceversa, so that members 25 and 25' can freely move vertically in respect to each other, while units 38 and 38' assure a steady sliding connection therebetween and they easily withstand any torque which could cause platform 15 to incline in respect to the horizontal.

It should be noted here that the structure and position of members 25 and 25', which are vertical and open at the bottom thereof, and the nature of bearings 36 and 36' (A, B, C), which are closed and self-lubricated, assure the operation of the guiding members even in objectively difficult environmental conditions, such as in the case of installations in desertic areas where the sand, for its very nature, accumulates in and penetrates into the relatively movable members, thus hindering the movements thereof.

As described above the apparatus and accessories necessary to perform the refuelling operation of an aircraft, such as manometers, meters of the rate of flow, opening and closing sluice valves, operation controls, all schematically represented on control board 40, filters 41 and delivery hose 13, that is wound on drum 42, are all mounted on platform 15 and protected by movable cover 16.

Roof or cover 16 comprises a thick rectangular steel plate having the same size as the opening of pit BC and being slidingly mounted on rollers 47 which can freely rotate on frame 18.

Furthermore, as mentioned above, platform 15 is supported by a hydraulic cylinder and piston unit or jack 21 which comprises a cylinder 43 (FIGS. 6 and 7) anchored to platform 15 and a piston, the stem of which is provided with a "foot" 44 pivoted on pin 45 integral with base pillar 46 which is anchored to bottom slab Sl of pit BC. It should be noted that the above-described connection with base pillar 46 allows hydraulic cylinder and piston unit 21 to follow the inevitable oscillations of platform 15 during its vertical movements.

With such an arrangement, station 10 is completely hidden and out of sight when platform 15 is in the lowered position (FIGS. 2, 3 and 4).

By a suitable operation of hydraulic unit 21, station 10 can be lifted to the raised delivery position (FIG. 5), where cover 16 can move backward sliding on rollers 47 from the position drawn in phantom lines to the position drawn in full lines, in order to have an easy access to hose 13 and various controls.

The refuelling station of the invention is provided with a safety device 50 preventing cover 16 from closing inadvertently since, due to its weight, this cover could seriously injure the operators of the refuelling station.

This safety device essentially comprises a support for hanging delivery head 13A of hose 13 comprising a fork element 51 hinged at 52 on base 53. A traction spring 54 is arranged between fork element 51 and base 53.

With such an arrangement, device 50 will be in its inoperative lowered position, shown in FIG. 11, against the action of spring 54 which is now extended, owing to the weight of delivery head 13A hung to fork 51A of element 51, while device 50 will move to the position shown in FIG. 10 when delivery head 13A is removed from fork 51, once cover 16 has been moved to the open position shown in FIG. 5.

It will be noted here that with this construction of fork 51 and cover 16, edge 16A of cover 16 is placed behind the upper section 51B of fork 51A and, accordingly, cover 16 cannot reach its completely closed position (towards the right in the Figure) even if inadvertently pushed, thus avoiding any injures to the operators that are working standing on platform 15.

It should also be noted that the unit according to the invention can be used in many ways and it also allows the aircraft to be refuelled even without lifting completely platform 15. As a matter of fact, in an emergency case, to get access to hose 13 and controls 40 of the station it can be sufficient to lift slightly platform 15 and to cause cover 16 to slide to the open position (FIG. 4).

In this situation an operator can descend onto the platform and get out hose 13 therefrom for the refuelling operation without lifting completely the station.

Finally, the movable connection for supplying the fuel from end 12A of underground tube 12 from central tank 11 to hose 13, which is mounted on movable platform 15, can be realized with a flexible tube 60 having one end connected to end 12A of underground tube 12 and the other end connected to lower end 61, protruding rearward from wall 19, of an upwardly directed tube 62, the other end of which is connected to filters 41 and then to drum 42 on which hose 13 is wound.

However, at present for this purpose the extensible connecting unit disclosed in Italian patent application Ser. No. 48064A/76, filed on Feb. 15, 1978 in the name of the same applicant, is preferably used in connection with aircraft refuelling stations.

I claim:

1. An improved unit adapted to be completely hidden in the ground and intended to be used to refuel aircraft with a fuel contained within a tank placed at a distance from said aircraft through an underground delivery pipe-line, said unit essentially comprising: a cavity or pit having the shape of a rectangular parallelepipedon and dug in the ground; a movable rectangular platform carrying all the apparatus, devices, fitters, accessories, connecting and supplying tubes and control means required to refuel an aircraft; a frame anchored to said platform; a rectangular cover mounted to slide horizontally from a closed position to an open position, said cover being mounted on said frame above said platform and having the same size as the opening of said pit; means for supporting and lifting said platform, received within said pit; means for guiding the vertical movements of said platform, completely received within said pit; and connecting means for connecting an underground pipe-line ending at said pit to a connecting tube carried by said movable platform, the components of said unit being so arranged that said platform can move from an inoperative lowered portion wherein said cover in the closed portion is flush with edges of said pit thus closing completely and hiding said unit placed below the cover, to a completely raised delivery position wherein said platform is at essentially the same level as said edges of said pit once said cover has been moved to the open position thus leaving the unit completely exposed, said platform supporting and lifting means including means enabling the platform to stop in a plurality of partially raised positions even at the slightest elevation needed to extend a refuelling hose, said means enabling the platform to stop providing that said cover can be moved horizontally in coordination with the raising movement whereby the refuelling operation can be performed through the opening thus obtained without lifting said unit to the completely raised position; the means for guiding the vertical movement of the platform comprising: two pairs of vertically arranged hollow guide members identical with each other are arranged at the sides of said hydraulic unit and aligned therewith and extending between said platform and the bottom of said pit, said hollow guide members being each made from a solid metal sheet and shaped as a prism of an irregular cross-section having a wall, called main wall, bearing a plate at one end and having a central longitudinal slot, extending throughout the remaining length of said main wall, a web integral with said plate, a support element of cylindrical shape mounted at the end of said web and three hermetically closed and self-lubricated ball bearings freely rotating between the branches of three corresponding forks, each radially spaced of 120° from the other and integral with said cylindrical support, said two hollow guide members being placed side by side and one being upside-down in respect to the other, the respective main walls thereof being adjacent and parallel to each other, the web of one of said hollow guide members being received within the slot of said other hollow guide member, so that said three bearings integral with the respective cylindrical support of each of said hollow guide members are received within the cavity of said other hollow guide member and in rolling engagement with three inner walls thereof not adjacent to each other, for relative axial movement of the guide members of each pair; the unit further comprising a safety device adapted to prevent said sliding cover from sliding back to its completely closed position during a refuelling operation, said safety device comprising: spring biassed hang means pivoted so as to rotate from an inoperative lowered position, against the action of said spring means, when the delivery head means is attached thereto, to an operative, safety raised position, where they are biassed by said spring means, whenever said delivery head means is detached from said hang means in order to perform said refuelling operation, and wherein said hang means are in the path of said cover preventing the same from sliding back to its completely closed position.

2. The improved unit according to claim 1, wherein said supporting and raising means comprises a hydraulic cylinder and piston unit.

3. The improved unit according to claim 1, wherein said connecting means connecting the end of said underground pipe-line ending at said pit, to said connecting tube mounted on said movable platform comprises an extensible connecting unit.

* * * * *